(12) United States Patent
Nannoni et al.

(10) Patent No.: US 8,297,549 B2
(45) Date of Patent: Oct. 30, 2012

(54) HELICOPTER ROTOR

(75) Inventors: Fabio Nannoni, Novara (IT); Pierre Abdel Nour, Vergiate (IT); Dante Ballerio, Caronno Varesino (IT)

(73) Assignee: Agusta S.p.A., Samarate Frazione Cascina Costa (IT)

( * ) Notice: Subject to any disclaimer, the term of this patent is extended or adjusted under 35 U.S.C. 154(b) by 387 days.

(21) Appl. No.: 12/610,930

(22) Filed: Nov. 2, 2009

(65) Prior Publication Data

US 2010/0163668 A1 Jul. 1, 2010

(30) Foreign Application Priority Data

Nov. 11, 2008 (EP) .................................... 08425722

(51) Int. Cl.
*B64C 27/82* (2006.01)
(52) U.S. Cl. .................. 244/17.19; 267/141.2
(58) Field of Classification Search ............... 244/17.11, 244/17.19, 17.27; 188/293, 140.12, 141.2
See application file for complete search history.

(56) References Cited

U.S. PATENT DOCUMENTS

| | | | | |
|---|---|---|---|---|
| 2,639,776 | A * | 5/1953 | Stanley | 416/106 |
| 3,591,109 | A * | 7/1971 | McLarty | 244/17.23 |
| 4,249,862 | A | 2/1981 | Waddington et al. | |
| 4,297,078 | A | 10/1981 | Martin | |
| 4,372,431 | A * | 2/1983 | Desjardins | 188/380 |
| 5,498,129 | A * | 3/1996 | Dequin et al. | 415/209.3 |
| 5,749,540 | A * | 5/1998 | Arlton | 244/17.13 |
| 6,325,327 | B1 * | 12/2001 | Zoppitelli et al. | 244/17.27 |
| 6,676,074 | B2 * | 1/2004 | Zoppitelli et al. | 244/17.11 |
| 2002/0079630 | A1 * | 6/2002 | Bachmeyer et al. | 267/140.13 |

FOREIGN PATENT DOCUMENTS

| | | |
|---|---|---|
| DE | 1531376 | 1/1970 |
| DE | 3144100 | 5/1983 |
| EP | 1371554 | 12/2003 |
| FR | 2373445 | 7/1978 |

OTHER PUBLICATIONS

Search Report in European Application No. 08425722 dated Mar. 23, 2009.

* cited by examiner

*Primary Examiner* — Tien Dinh
*Assistant Examiner* — Keith L Dixon
(74) *Attorney, Agent, or Firm* — McCracken & Frank LLC

(57) ABSTRACT

A rotor for a helicopter, having a drive shaft rotating about a first axis; a hub angularly integral with the drive shaft about the first axis; and at least two blades projecting from the hub, on the opposite side to the first axis, and extending along respective second axes crosswise to the first axis; each blade is movable with respect to the hub and the other blades about a respective fourth axis parallel to the first axis, about the respective second axis, and about a respective third axis crosswise to the first and respective second axis; the rotor also has a number of first dampers for damping vibration associated with at least oscillation of the relative blades about the respective fourth axes; the first dampers are connected to one another and each to a relative blade; and, in a radial direction with respect to the first axis, at least one first damper is located between the first axis and the fourth axis of the relative blade.

19 Claims, 6 Drawing Sheets

HELICOPTER ROTOR

The present invention relates to a helicopter rotor.

BACKGROUND OF THE INVENTION

Helicopters are known comprising a fuselage; a main rotor mounted on top of a central portion of the fuselage; and an antitorque tail rotor for counteracting the torque transmitted from the main rotor to the fuselage.

Articulated main rotors and/or antitorque rotors are also known.

More specifically, articulated rotors comprise a drive shaft that rotates about a first axis; a hub that rotates integrally with the drive shaft about the first axis; and a number of blades projecting from the hub along respective second axes radial with respect to the first axis.

Each blade can rotate with respect to the hub about the respective second axis to vary its angle of attack with respect to the airstream, and can oscillate freely with respect to the hub about a respective third axis to perform a so-called flapping movement. Each third axis is crosswise to the first and second axis of the relative blade.

Each blade also oscillates freely with respect to the hub and the other blades about a respective fourth axis, parallel to the first axis, to perform a so-called lead-lag movement.

A need is felt within the industry to damp vibration induced by lead-lag movement of the blades over a wide range of drive shaft rotation speeds about the first axis, but without impairing aerodynamic performance of the rotor itself.

SUMMARY OF THE INVENTION

It is an object of the present invention to provide a helicopter rotor designed to achieve the above cheaply and easily.

According to the present invention, there is provided a helicopter rotor as claimed in the attached claims.

DETAILED DESCRIPTION OF THE INVENTION

A preferred, non-limiting embodiment of the present invention will be described by way of example with reference to the accompanying drawings, in which.

Figure 1:
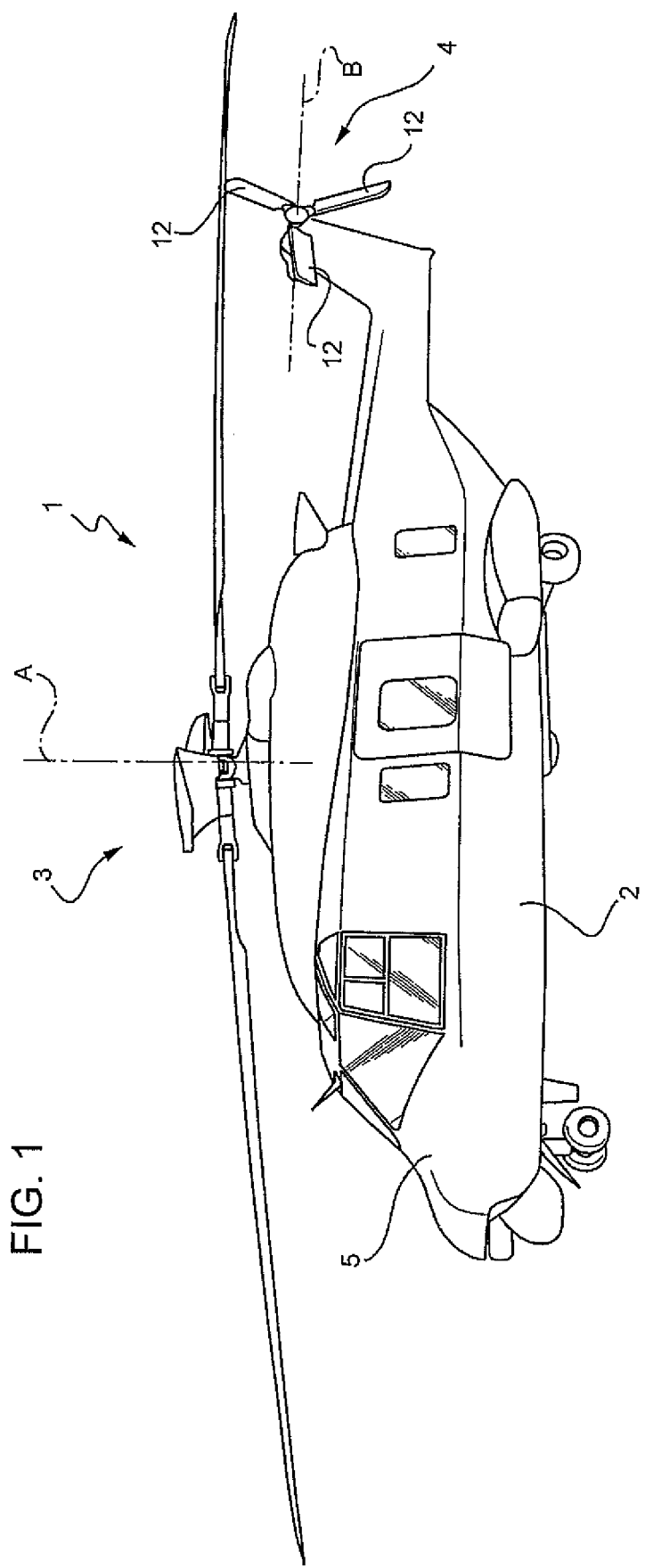
FIG. 1 shows a view in perspective of a helicopter comprising a rotor in accordance with the present invention.
Figure 2:
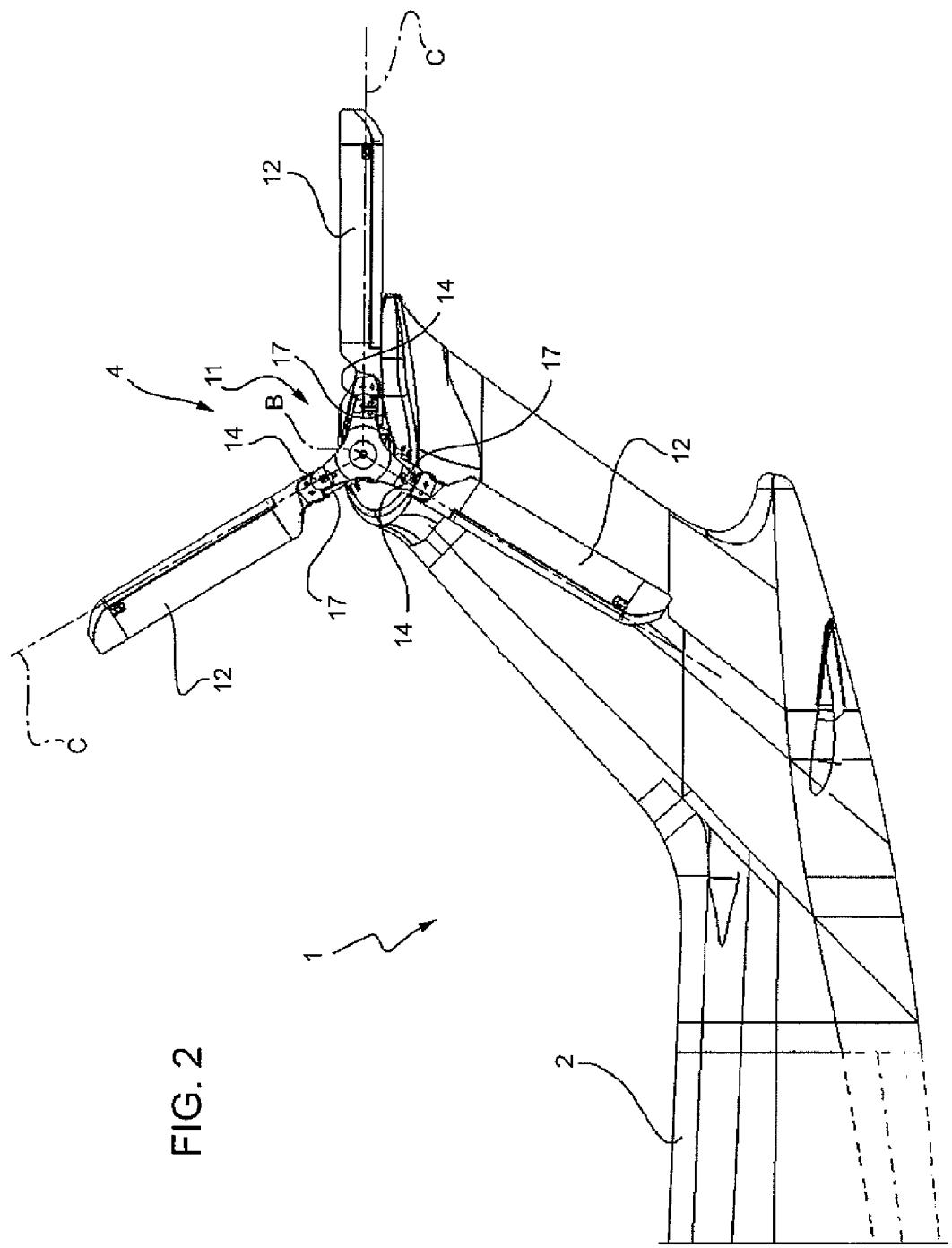
FIG. 2 shows a side view of a tail portion of the FIG. 1 helicopter.

Number 1 in FIG. 1 indicates a helicopter substantially comprising a fuselage 2 having a nose 5; a main rotor 3 on top of fuselage 2 and rotating about an axis A; and an antitorque tail rotor 4 fitted to a tail fin projecting from fuselage 2 at the opposite end to nose 5.

More specifically, main rotor 3 provides helicopter 1 with the lift and thrust required to lift and move helicopter 1 forward, while rotor 4 exerts force on the tail fin to generate a righting torque on fuselage 2 to balance the torque exerted by main rotor 3 on fuselage 2, and which would otherwise rotate fuselage 2 about axis A.

Figure 3:
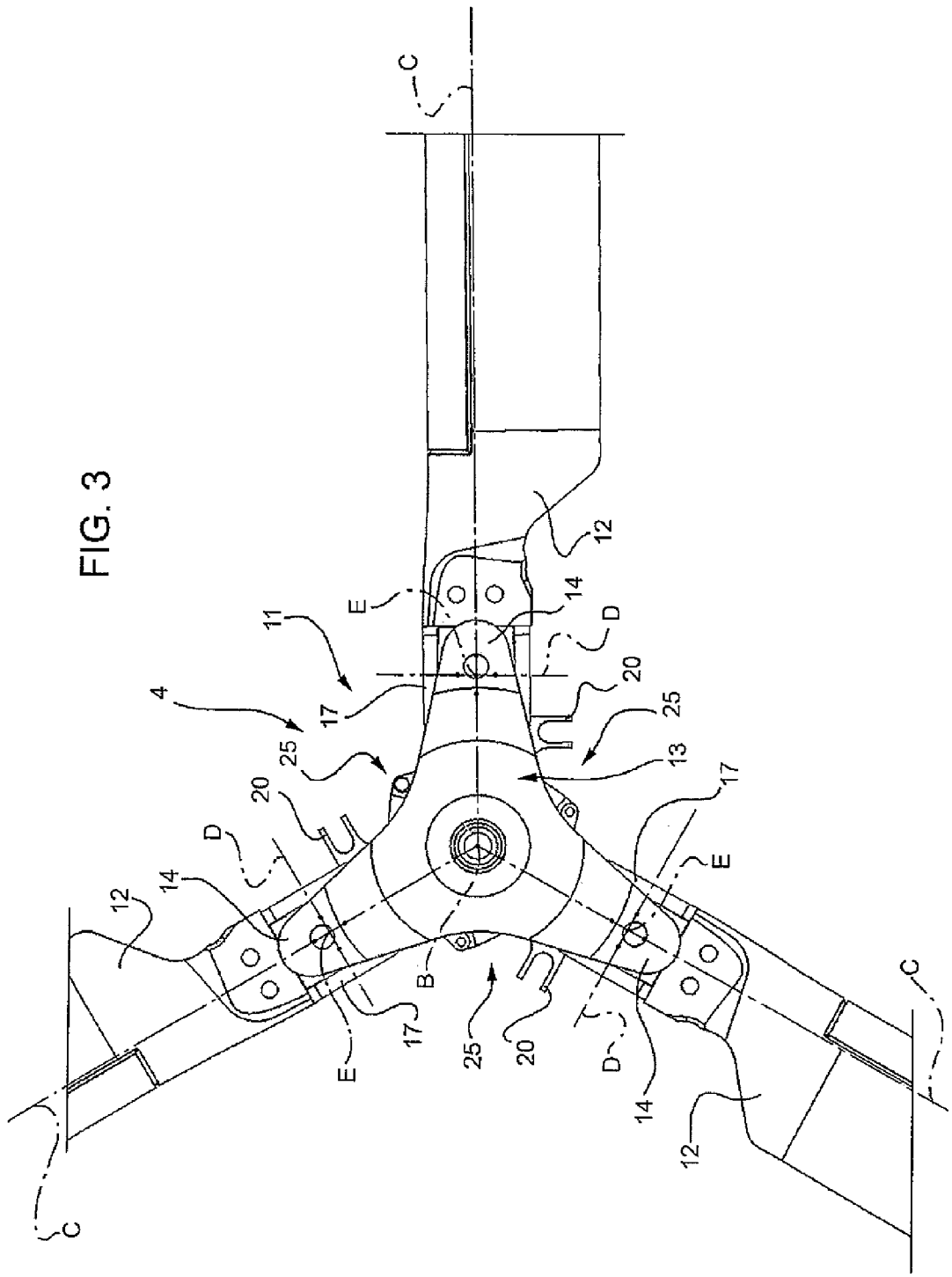
FIG. 3 shows a larger-scale front view of a first embodiment of the FIGS. 1 and 2 helicopter rotor.

Rotor 4 is articulated, and substantially comprises (FIGS. 3 to 5):
- a drive shaft 10 (only shown schematically in FIGS. 4 and 5) that rotates about an axis B crosswise to the axis A of rotation of main rotor 3;
- a hub 11 fitted to shaft 10 to rotate integrally with shaft 10 about axis B; and
- a number of blades 12 projecting from hub 11 on respective opposite sides of axis B and elongated along respective axes C crosswise to axis B.

More specifically, hub 11 substantially comprises:
- two plates 13 lying in respective planes perpendicular to axis B, spaced apart in a direction parallel to axis B, and each having a number of—in the example shown, three—appendixes 14 extending radially on the opposite side to axis B;
- a main body 15 interposed axially between plates 13 and extending parallel to axis B; and
- a number of—in the example shown, three—cross members 16 parallel to and at a distance from axis B, equally spaced angularly about axis B, and each interposed between corresponding appendixes 14 of plates 13.

More specifically, body 15 comprises a number of—in the example shown, three—slots 55 (FIG. 4) equally spaced angularly about axis B and open on the opposite side to axis B.

Each blade 12 comprises a main portion defining the surfaces for sustaining/propelling helicopter 1; and a root portion 17 radially more inner than the main portion with respect to axis B.

More specifically, root portion 17 of each blade 12 substantially comprises a shank 21 (FIGS. 4 and 5) defining a radially inner end of blade 12 with respect to axis B; and a connecting member 18 hinged to a respective cross member 16 and interposed between shank 21 and the main portion of relative blade 12.

Connecting member 18 of each blade 12 is hinged to respective cross member 16 to move about respective axis C, about a respective axis E parallel to and at a distance from axis B, and about a respective axis D perpendicular to axis B and crosswise to respective axis C.

Connecting member 18 of each blade 12 is hinged to respective cross member 16 with the interposition of a respective elastomeric bearing 19; and each elastomeric bearing 19 allows respective blade 12 to rotate with respect to hub 11 about a centre of rotation F at which respective axes C, D, E intersect.

Each blade 12 is therefore free to oscillate with respect to hub 11 about respective axis D to perform the flapping movement.

Under external control, each blade 12 is also free to rotate about respective axis C with respect to hub 11 and the other blades 12 to vary its angle of attack with respect to the airstream.

More specifically, root portion 17 of each blade 12 comprises an appendix 20 eccentric with respect to respective axis C, and on which force is exerted by the external control to rotate blade 12 about respective axis C.

Each blade 12 is also free to oscillate about respective axis E with respect to hub 11 and the other blades 12 to perform the lead-lag movement.

Rotor 4 also comprises a number of dampers 25 (FIGS. 2 to 5) connected to one another and each connected to a respective blade 12.

Each damper 25 serves to damp vibration caused by oscillation of respective blade 12 about axis E and with respect to the other blades 12 and hub 11, i.e. to damp vibration caused by lead-lag movement of respective blade 12.

Working radially with respect to axis B, each damper 25 is advantageously located between axis B and axis E of respective blade 12.

More specifically, each damper 25 comprises a body 26 preferably made of rigid metal material and defining a cavity 27; and an elastomeric member 28 housed in cavity 27. Bodies 26 of dampers 25 are preferably made of metal material.

Body 26 of each damper 25 comprises:
a wall 30 parallel to axis B, facing and at a distance from body 15, and fitted through with shank 21;
two opposite walls 31 perpendicular to axis B and projecting from respective axial end edges of respective wall 30, on the opposite side to axis B; and
two walls 32 lying in respective planes parallel to axis B, projecting from relative wall 30 on the opposite side to axis B, and interposed between respective walls 31 in a direction parallel to axis B.

Body 26 of each damper 25 also comprises two walls 33 parallel to axis B and projecting from relative wall 30 on the opposite side to axis B. More specifically, walls 33 extend from respective ends, tangential with respect to axis B, of body 26 of relative damper 25, and walls 32 are interposed between relative walls 33.

Each wall 30 comprises a flat portion 34, and a curved concave portion.

Each wall 31 comprises an end edge 36 opposite wall 30. More specifically, end edge 36 of each wall 31 in turn comprises a flat central portion 37, and two curved, convex end portions 38.

Each elastomeric member 28 is substantially prismatic, and is preferably made of cured rubber and connected to walls 31, 32 of relative body 26 by layers of adhesive not shown.

Each cavity 27 is bounded by walls 32 of respective body 26 in a direction tangential to axis B, and by a portion of wall 30 of relative body 26 interposed between respective walls 32 and radially inner with respect to axis B.

Axially with respect to axis B, each cavity 27 is bounded by the portions of respective walls 31 bounded by portions 37 of respective end edges 36.

Figure 4:
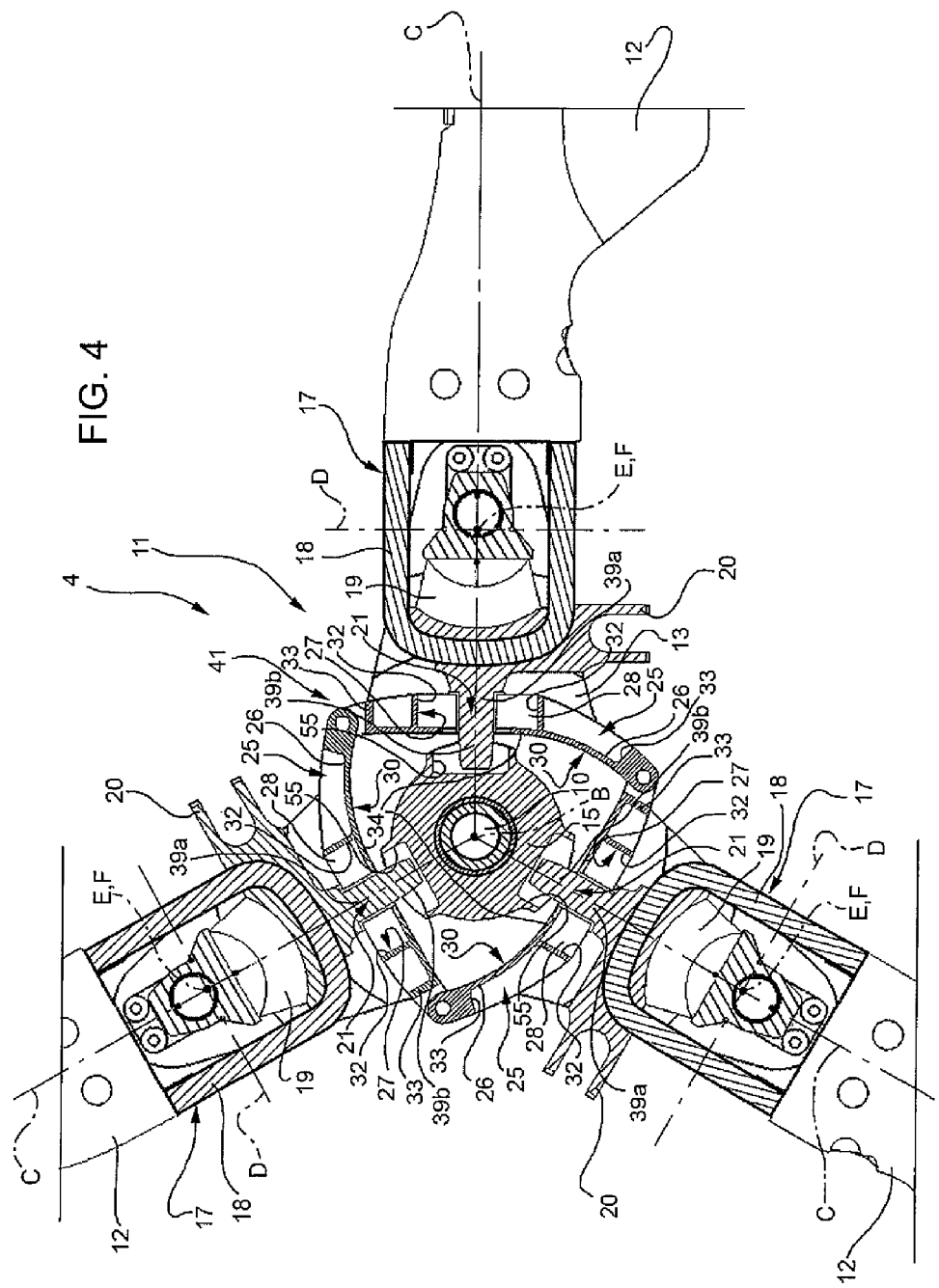
FIG. 4 shows a front view, with parts removed for clarity, of the first embodiment of the rotor in FIG. 3.
Figure 5:
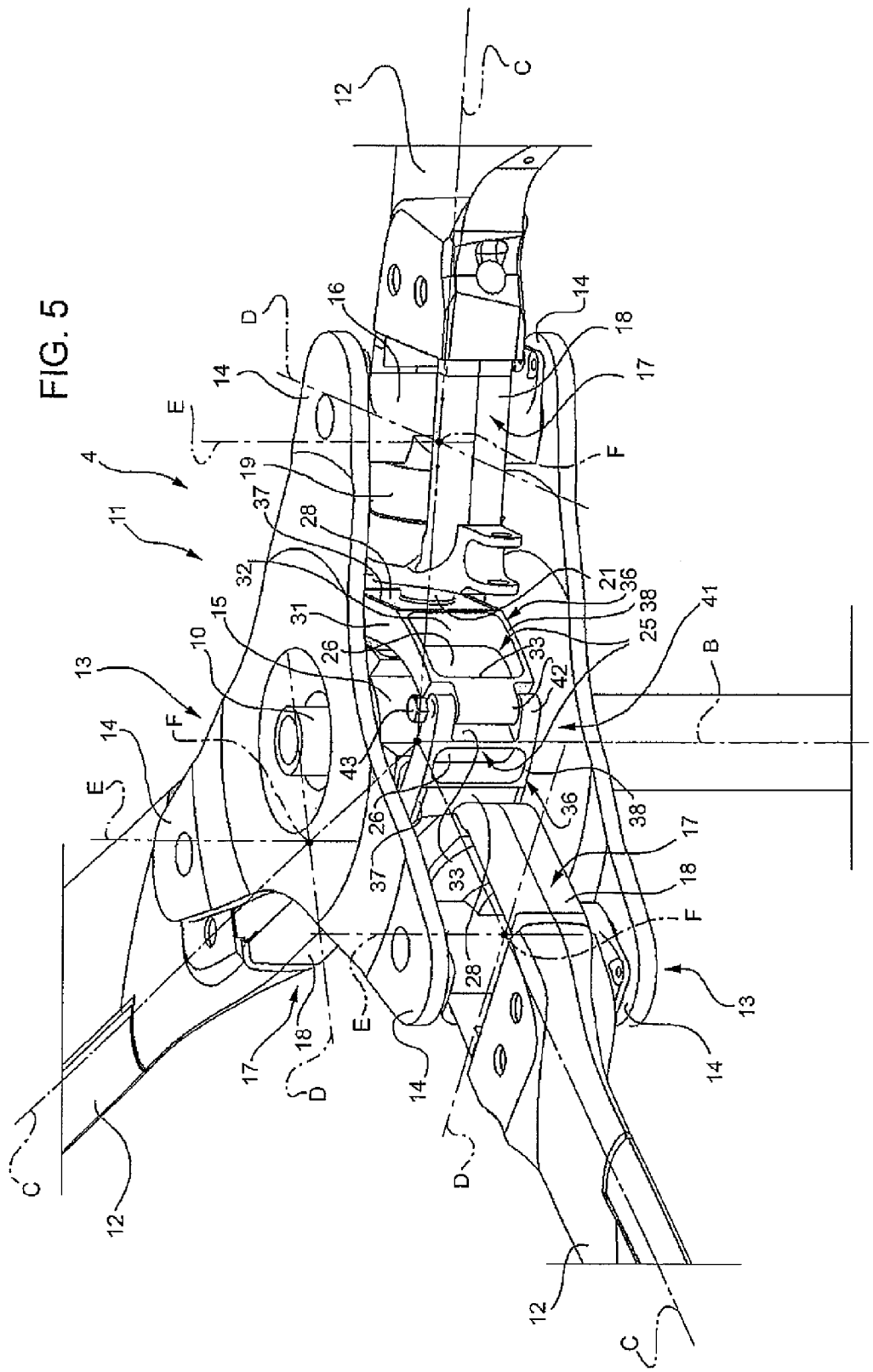
FIG. 5 shows a view in perspective of the first embodiment of the rotor in FIG. 3.

With reference to FIG. 4, shank 21 of each blade 12 comprises a main portion 39a engaging a seat defined by elastomeric member 28 of relative damper 25; and an end portion 39b radially more inner than main portion 37 with respect to axis B. More specifically, end portion 39b of each shank 21 projects from wall 30 of relative damper 25 towards axis B, and is housed loosely inside a respective slot 55.

Slots 55 define respective safety stop surfaces for end portions 39b of relative shanks 21, to prevent excessive oscillation of relative blades 12 about respective axes D and E from impairing operation of rotor 4.

Dampers 25 are connected to one another to define respective arms of a ring 41 surrounding body 15 of hub 11.

More specifically, each damper 25 comprises two connecting portions 42 (FIG. 5) projecting from respective walls 33, on the opposite side to respective walls 32 and tangentially to axis B.

The adjacent connecting portions 42 of adjacent dampers 25 are connected by respective bolts 43 with respective axes parallel to axis B.

Dampers 25 are only connected to blades 12, and are not connected directly to hub 11.

Ring 41 is therefore free to oscillate about axis B in response to rotation of blades 12 about respective axes E.

In actual use, shaft 10 rotates hub 11 about axis B.

Rotation of hub 11 in turn rotates blades 12 collectively about axis B.

Blades 12 are normally subjected to different aerodynamic loads having different components in a direction parallel to axis B, and which tilt blades 12 and hub 11 about respective axes D with respect to shaft 10, thus resulting in flapping of blades 12.

The flapping movement alters the distance between the centre of mass of each blade 12 and axis B.

To preserve the angular momentum with respect to axis B, each blade 12 rotates about respective axis E to accelerate its rotation speed with respect to axis B as its centre of mass approaches axis B.

Conversely, each blade 12 rotates about respective axis E to reduce its rotation speed with respect to axis B as its centre of mass moves away from axis B.

Repeated periodic oscillation of blades 12 about respective axes E produces vibration, which is damped by dampers 25 by deforming elastomeric members 28.

Rotation of blades 12 about respective axes E sets ring 41 into a balanced position with respect to axis B.

Figure 6:
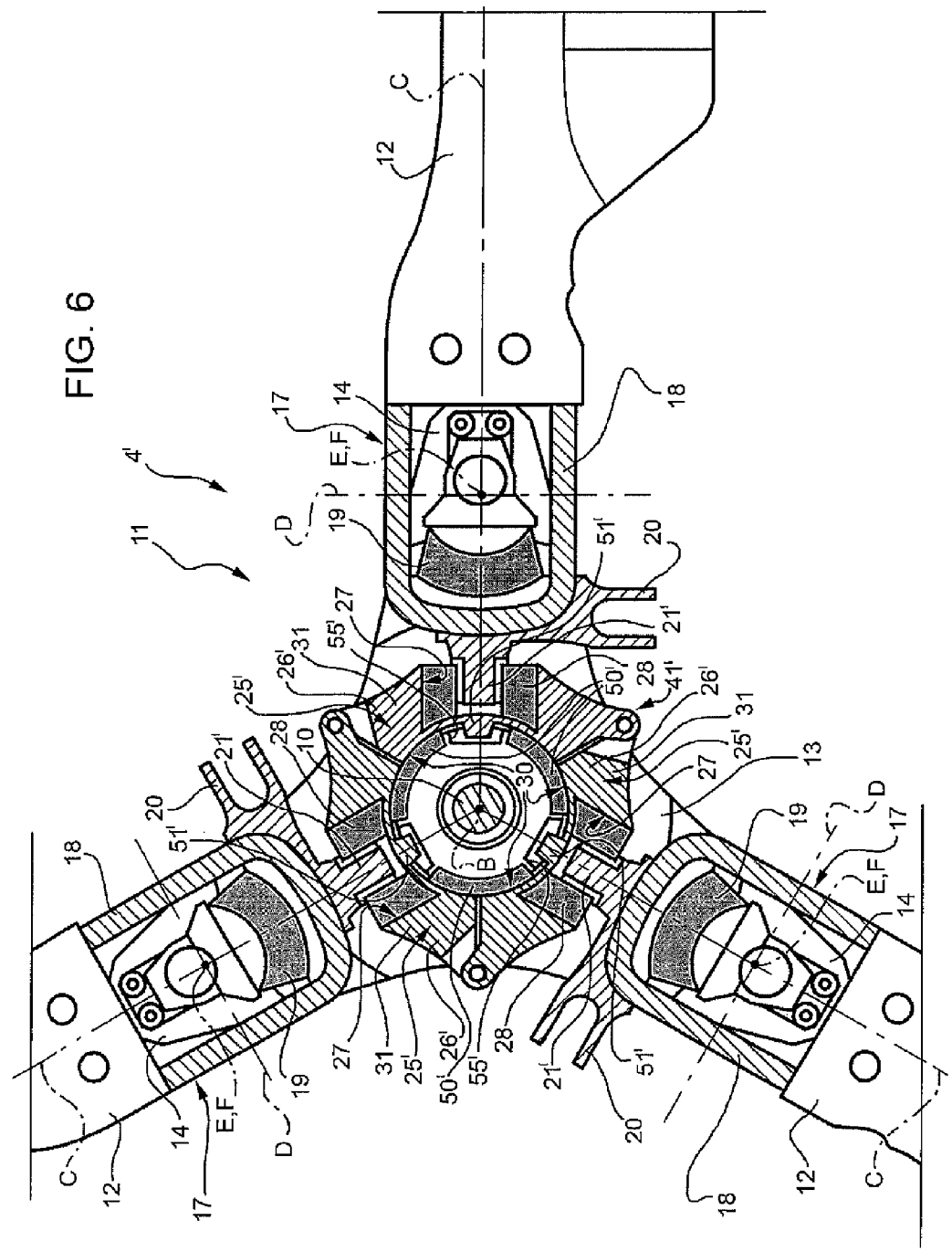
FIG. 6 shows a larger-scale front view of a second embodiment of the FIGS. 1 and 2 helicopter rotor.

Number 4' in FIG. 6 indicates as a whole a different embodiment of a helicopter rotor in accordance with the present invention. Rotor 4' is similar to rotor 4, and is only described below as regards the differences between the two; any corresponding or equivalent parts of rotors 4, 4' being indicated, where possible, using the same reference numbers.

More specifically, rotor 4' differs from rotor 4 by comprising a number of—in the example shown, three—dampers 50' made of elastomeric material, e.g. rubber.

Each damper 50' is elongated parallel to axis B, is of constant thickness radially with respect to axis B, and is bounded, in cross section perpendicular to axis B, by two arcs of the same angle and with their centre at axis B.

Radially with respect to axis B, each damper 50' is interposed between a radially outer surface, with respect to axis B, of main body 15 of hub 11, and a respective pair of consecutive dampers 25'.

More specifically, each damper 50' cooperates with adjacent end portions of walls 30 of respective dampers 25'.

Ring 41' is therefore secured to hub 11 by dampers 50', and is therefore more rigid than ring 41 with respect to rotation about axis B.

Dampers 50' also provide mainly for damping vibration associated with oscillation of blades 12 about respective axes D.

Rotor 4' also differs from rotor 4 by shank 21' of each blade 12 being embedded completely inside elastomeric member 28 of relative blade 12, and by each damper 25' comprising a trapezoidal tooth 51' projecting towards axis B from relative body 26', and engaging a relative slot 55' defined by main body 15 of hub 11.

More specifically, working tangentially with respect to axis B, teeth 51' alternate with dampers 50'.

Operation of rotor 4' is similar to that of rotor 4, and therefore not described in detail.

The advantages of rotor 4, 4' according to the present invention will be clear from the above description.

In particular, dampers 25, 25' are positioned much closer radially to axis B.

Centrifugal stress on dampers 25, 25', during operation of rotor 4, 4', is therefore greatly reduced.

As a result, damping by dampers 25, 25' of vibration of blades 12 about respective axes E is affected little by centrifugal stress on blades 12.

Dampers 25, 25' are therefore also effective at high rotation speeds of drive shaft 10 about axis B. This is particularly advantageous when rotor 4 is an antitorque tail rotor, in that tail rotor drive shafts normally rotate at high speed.

Moreover, the effect of dampers 25, 25' on the overall aerodynamic efficiency of rotor 4, 4' is minimum.

Clearly, changes may be made to rotor 4 as described and illustrated herein without, however, departing from the protective scope defined in the accompanying Claims.

In particular, rotor 4, 4' may be employed as a main rotor of helicopter 1.

The invention claimed is:

1. A rotor for a helicopter, comprising:
   a drive shaft rotating about a first axis;
   a hub angularly integral with said drive shaft about said first axis;
   at least two blades projecting from said hub, on the opposite side to said first axis, and extending along respective second axes crosswise to said first axis; each said blade being movable with respect to said hub and the other said blades about a respective fourth axis parallel to said first axis, about the respective said second axis, and about a respective third axis crosswise to said first and respective second axis; and
   a number of first dampers for damping vibration associated with at least oscillation of the relative said blades about the respective said fourth axes; said first dampers being connected to one another and each to a relative blade;
   said blades rotating, in use, collectively about said first axis together with said hub;
   characterized in that at least one said first damper is located between said first axis and said fourth axis of the relative blade, in a radial direction with respect to said first axis; said rotor further comprising a second damper interposed between said hub and at least one said first damper.

2. A rotor as claimed in claim 1, characterized in that at least one said blade comprises a connecting member hinged to said hub to move about the respective said second, third, and fourth axis; and a shank defining a radially inner end of the blade with respect to said first axis, and cooperating with the relative said first damper.

3. A rotor as claimed in claim 1, characterized in that said first dampers define respective arms of a ring surrounding said first axis.

4. A rotor as claimed in claim 1, characterized in that at least one of said first dampers comprises a tooth engaging a slot defined by said hub.

5. A rotor as claimed in claim 2, characterized in that each said first damper comprises an elastomeric member fitted through at least partly with said shank of the relative said blade; and a body made of rigid material and defining a cavity housing said elastomeric member.

6. A helicopter comprising a main rotor; and an antitorque tail rotor as claimed in claim 1.

7. A helicopter comprising an antitorque tail rotor; and a main rotor as claimed in claim 1.

8. A rotor as claimed in claim 2, characterized in that said first dampers define respective arms of a ring surrounding said first axis.

9. A rotor as claimed in claim 2, characterized in that at least one of said first dampers comprises a tooth engaging a slot defined by said hub.

10. A rotor as claimed in claim 3, characterized in that at least one of said first dampers comprises a tooth engaging a slot defined by said hub.

11. A rotor as claimed in claim 6, characterized in that each said first damper comprises an elastomeric member fitted through at least partly with said shank of the relative said blade; and a body made of rigid material and defining a cavity housing said elastomeric member.

12. A helicopter comprising a main rotor; and an antitorque tail rotor as claimed in claim 2.

13. A helicopter comprising a main rotor; and an antitorque tail rotor as claimed in claim 3.

14. A helicopter comprising a main rotor; and an antitorque tail rotor as claimed in claim 4.

15. A helicopter comprising a main rotor; and an antitorque tail rotor as claimed in claim 5.

16. A helicopter comprising a main rotor; and an antitorque tail rotor as claimed in claim 8.

17. A helicopter comprising a main rotor; and an antitorque tail rotor as claimed in claim 9.

18. A helicopter comprising a main rotor; and an antitorque tail rotor as claimed in claim 10.

19. A helicopter comprising a main rotor; and an antitorque tail rotor as claimed in claim 11.

* * * * *